United States Patent
Xu

(10) Patent No.: US 7,593,050 B2
(45) Date of Patent: Sep. 22, 2009

(54) DELAY MANAGEMENT CIRCUIT FOR READING OUT LARGE S/H ARRAYS

(75) Inventor: Weize Xu, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 588 days.

(21) Appl. No.: 11/363,130

(22) Filed: Feb. 27, 2006

(65) Prior Publication Data

US 2007/0200942 A1 Aug. 30, 2007

(51) Int. Cl.
- H04N 3/14 (2006.01)
- H04N 5/335 (2006.01)
- H01L 31/062 (2006.01)
- H01L 31/113 (2006.01)

(52) U.S. Cl. .................. 348/308; 348/295; 257/291
(58) Field of Classification Search ................ 348/295, 348/311, 312; 257/290, 293, 294
See application file for complete search history.

(56) References Cited

U.S. PATENT DOCUMENTS

| | | | | |
|---|---|---|---|---|
| 4,996,601 A | * | 2/1991 | Arimori | 348/294 |
| 5,115,303 A | * | 5/1992 | Hayashi | 348/265 |
| 6,130,423 A | * | 10/2000 | Brehmer et al. | 250/208.1 |
| 6,166,769 A | * | 12/2000 | Yonemoto et al. | 348/308 |
| 6,201,573 B1 | * | 3/2001 | Mizuno | 348/308 |
| 6,222,175 B1 | * | 4/2001 | Krymski | 250/208.1 |
| 6,421,085 B1 | * | 7/2002 | Xu | 348/308 |
| 7,465,934 B2 | * | 12/2008 | Xu | 250/370.14 |
| 2004/0141383 A1 | | 7/2004 | Lee | |

FOREIGN PATENT DOCUMENTS

| | | |
|---|---|---|
| GB | 2 223 909 | 4/1990 |
| WO | 2005/117418 | 12/2005 |

OTHER PUBLICATIONS

"Signal Processing in CMOS Image Sensors" by Raj Nair et al., Signal Processing Systems, 2000, SIPS 2000. 2000 IEEE Workshop on Oct. 11-13, 2000, Piscataway, NJ, USA, pp. 801-810, XP010525289, ISBN: 0-7803-6488-0.

* cited by examiner

*Primary Examiner*—Jason Chan
*Assistant Examiner*—Kelly L Jerabek
(74) *Attorney, Agent, or Firm*—Peyton G. Watkins

(57) ABSTRACT

An image sensor includes a plurality of pixels for capturing an image; a sample and hold circuit array having a plurality of units for receiving signals from the plurality of pixels representing the captured image; a decoder for selecting each of the units of the sample and hold circuit array for output; and a delay circuit that includes an adjustable time delay to the decoder for compensating for time delays.

10 Claims, 4 Drawing Sheets

DELAY MANAGEMENT CIRCUIT FOR READING OUT LARGE S/H ARRAYS

FIELD OF THE INVENTION

The invention relates generally to the field of CMOS image sensors and, more particularly to, such image sensors having a programmable delay circuit for correcting the non-uniform delays at the column decoder output caused by the long address bus.

BACKGROUND OF THE INVENTION

As the CMOS image size and speed continue to increase, the column sample and hold array is becoming larger and time to read out a column S/H circuit is shorter. A decoder circuit is needed to address each individual S/H circuit within such S/H array to the output. The input address codes are sent to the decoder inputs through long buses which are usually the size of a row of pixels. Due to the large resistance and capacitance of the wires, these decoder addresses are sent the decoder with larger and larger delays as the column S/H circuit array is being read out one by one in the direction away from the decoder address drivers. These delays reduce the effective read-out time and cause noise at the output of the column S/H array. An additional delay which reduces as the column sample and hold array is read out is added to the decoder address buses to compensate the delay due to the bus parasitic resistance and capacitance.

Consequently, a need exists for a CMOS image sensor which corrects for the non-uniform delays at the column decoder output caused by the long address bus.

SUMMARY OF THE INVENTION

The present invention is directed to overcoming one or more of the problems set forth above. Briefly summarized, according to one aspect of the present invention, the invention resides in an image sensor comprising a plurality of pixels for capturing an image; a sample and hold circuit array having a plurality of units for receiving signals from the plurality of pixels representing the captured image; a decoder for selecting each of the units of the sample and hold circuit array for output; and a delay circuit that includes an adjustable time delay to the decoder for compensating for time delays.

These and other aspects, objects, features and advantages of the present invention will be more clearly understood and appreciated from a review of the following detailed description of the preferred embodiments and appended claims, and by reference to the accompanying drawings.

ADVANTAGEOUS EFFECT OF THE INVENTION

The present invention has the following advantage of correcting for the non-uniform delays at the column decoder output caused by the long address bus. The present invention also increases the effective sensor readout speed and reduces the mis-sampling of the S/H circuit by the next stage circuit.

DETAILED DESCRIPTION OF THE INVENTION

Figure 1:
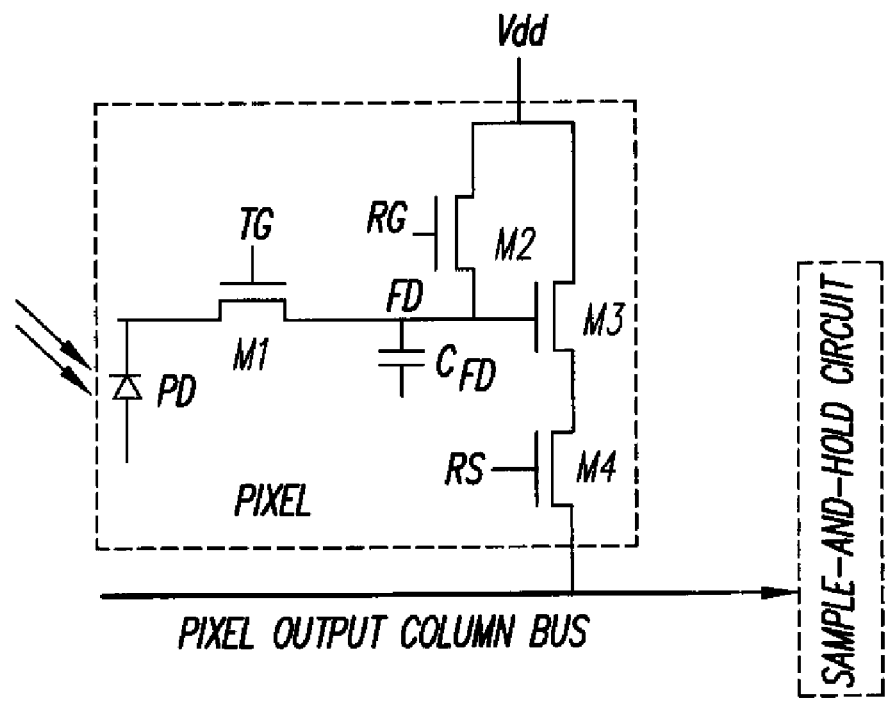
FIG. 1 is a schematic diagram of a typical pixel of the present invention.

FIG. 1 shows a typical 4-transistor CMOS active image sensor pixel. A photodiode PD collects charge in response to incident light. Transistor M1 is controlled by a voltage applied on its gate TG to transfer the charge accumulated in PD to the floating diffusion capacitor $C_{FD}$ when TG is "high". Floating diffusion capacitor $C_{FD}$ converts the charge to voltage. Transistor M2 resets the floating diffusion capacitor $C_{FD}$ when a "high" voltage is applied to its gate RG. The selectable pixel output buffer amplifier is composed of M3 and M4. M3 is the amplifier input transistor and M4 is the row-selecting transistor to enable the amplifier. The voltage at the floating diffusion FD is applied to the input of the pixel amplifier and sent to the sample-and-hold circuit array outside the pixel array when a "high' voltage is applied to the gate RS of transistor M4.

Figure 2:
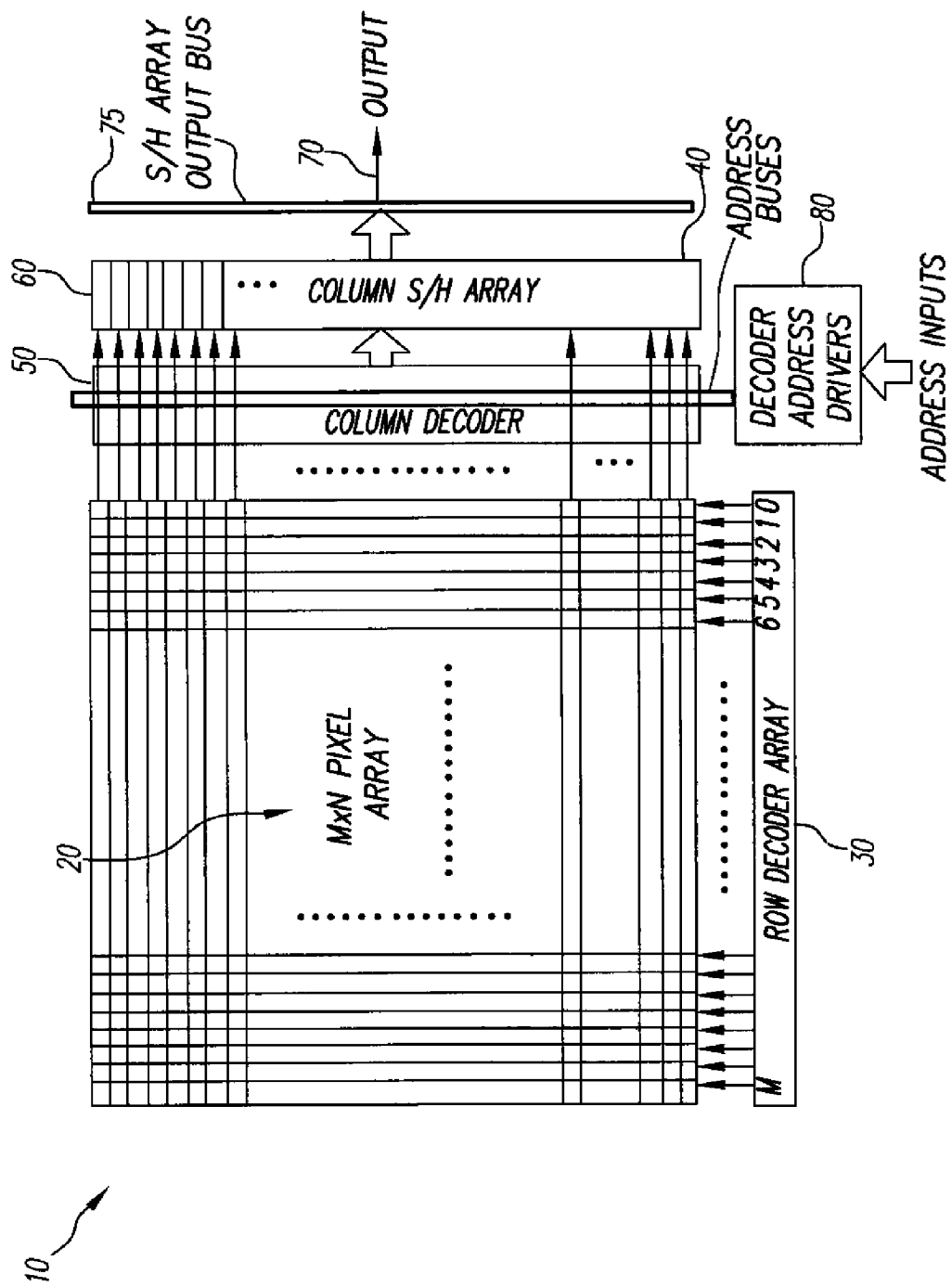
FIG. 2 is a block diagram of the image sensor of the present invention.

A block diagram of a CMOS image sensor 10 is shown in FIG. 2. The image sensor 10 includes a pixel array 20, a row decoder 30, a column sample and hold circuit array 40 and a column decoder 50. The image signal is generated within the pixel array 20 and is transferred to the column sample and hold circuit array 40 row by row (as indicated by the solid arrows). One row of the image signal is sampled and held by the sample and hold circuit array 40 which includes a plurality of units 60, one for each pixel signal. The sample and hold circuit array 40 sends the signals from each of the units 60 to the output 70 of the sample and hold circuit array 40 one unit at a time. The column decoder 50 selects which signal value from the sample and hold circuit array 40 will be output to an output bus 75 and the particular sequence of output to the output bus 75. Column decoder address drivers 80 are used to drive the address bus lines of the column decoder 50. Once a row of signal is sent out of the sample and hold circuit array 40, another row of image signal is moved to the sample and hold circuit array 40 from the pixel array 20. This process repeats until all rows in a frame of image are processed.

Figure 3:
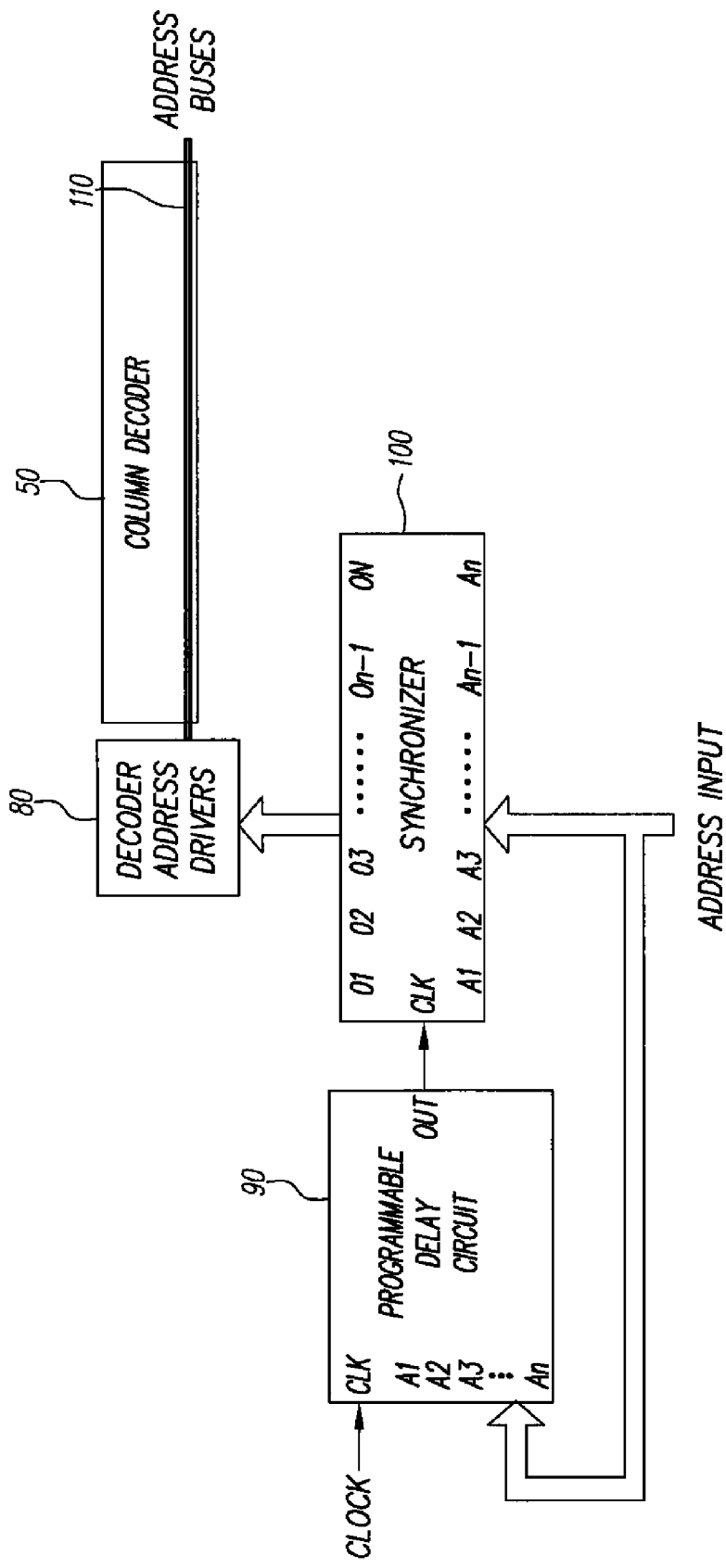
FIG. 3 is a block diagram of the delay management circuit of the present invention.

FIG. 3 shows a programmable delay circuit 90, an address synchronizer 100 and the decoder address driver circuit 80. A programmable delay circuit 90 adds a time delay to a master clock. The time delay at the output varies according to the particular address of the column decoder. For example, the address 000 (the first address) receives the maximum delay and address 111 (the last address) receives zero or substantially zero delay or minimal delay. Address 000 represents the physical location of the sample and hold circuit 40 which is closest to the driver 80, and address 111 represents the physical location of the sample and hold circuit 40 which is farthest from the driver 80. This delay will compensate for the inherent time delay that the decoder address bus 110 will have since there is an inherent delay as the signal travels along the bus of the column decoder 50. The first address 000 will have substantially zero inherent delay from the bus 110 so it receives the maximum time delay from the delay circuit 90. The last address will have maximum inherent time delay from the decoder bus 110 and will receive minimum time delay from the delay circuit 90. This produces a uniform or substantially uniform delay across the column decoder array 50. The synchronizer 100 synchronizes the input address to the output of the programmable delay circuit 90 so that the delay is added to the input address of the decoder 50.

Figure 4:
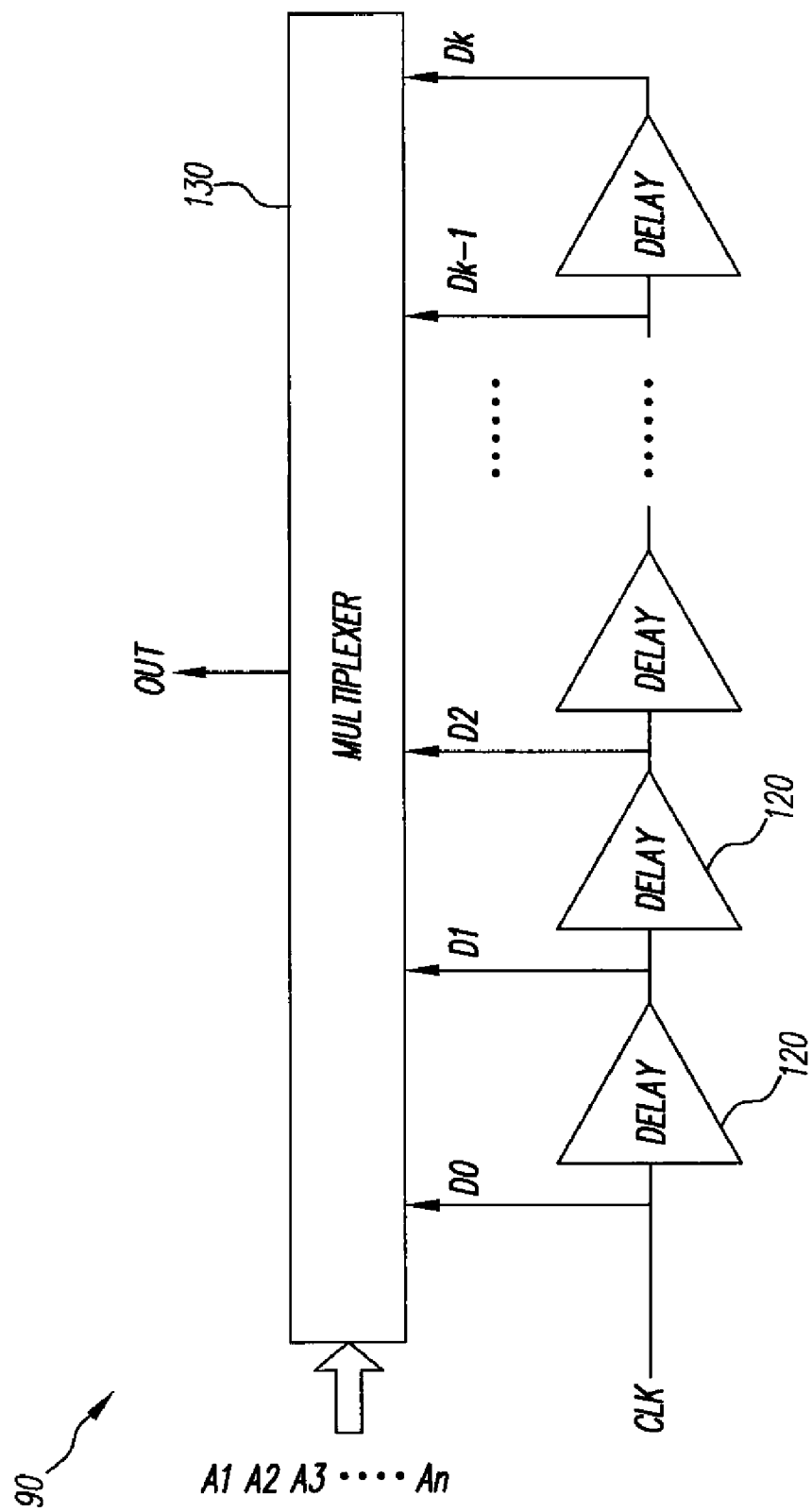
FIG. 4 is a block diagram of the programmable delay circuit of the present invention.

Referring to FIG. 4, there is shown a detailed schematic of the delay circuit 90. The delay circuit 90 includes a plurality of delay cells 120 having the same amount of time delay. A multiplexer 130 is connected to outputs of the delay cells 120 for selecting one output of the delay cells 120. This output corresponds to the desired time delay. For example, the output D0 includes zero delay cells, output D1 includes one delay cell and DK includes K delay cells. The particular address determines which output the multiplexer 130 selects to the output.

Figure 5:
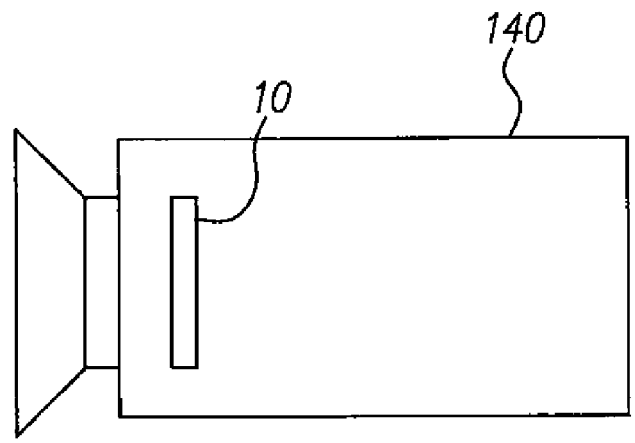
FIG. 5 is a side view of a digital camera of the present invention.

Referring to FIG. 5, there is shown a digital camera 140 having the image sensor 10 of the present invention included therein for illustrating a typical commercial embodiment (end user product) to which the ordinary consumer is accustomed.

The present invention has been described with reference to a preferred embodiment. However, it will be appreciated that variations and modifications can be effected by a person of ordinary skill in the art without departing from the scope of the invention.

PARTS LIST 10 image sensor
20 pixel array
30 row decoder
40 column sample and hold circuit array
50 column decoder
60 units
70 output
75 output bus
80 decoder address driver
90 programmable delay circuit
100 address synchronizer
110 address bus
120 delay cells
130 multiplexer
140 digital camera

The invention claimed is:

1. An image sensor comprising:
   (a) a plurality of pixels for capturing an image;
   (b) a sample and hold circuit array having a plurality of units for receiving signals from the plurality of pixels representing the captured image;
   (c) a delay circuit that includes an adjustable time delay for receiving address signals and, based on a particular address signal, generating a respective time delay for that address signal; and
   (d) a decoder for receiving the delayed address signals and, based on each address signal, selecting a respective unit of the sample and hold circuit array for output.

2. The image sensor as in claim 1, wherein the decoder includes a plurality of sequentially numbered unit addresses from 1 to N, and wherein the adjustable time delay decreases with an increase in unit address.

3. The image sensor as in claim 1, wherein the adjustable delay circuit includes a plurality of delay cells and a multiplexer for selecting one or more of the delay cells according to the decoder address.

4. The image sensor as in claim 1, wherein the delay circuit is a programmable delay circuit.

5. The image sensor as in claim 1 further comprising a synchronizer for synchronizing an output of the delay circuit and address inputs to the decoder.

6. A camera comprising:
   an image sensor comprising:
   (a) a plurality of pixels for capturing an image;
   (b) a sample and hold circuit array having a plurality of units for receiving signals from the plurality of pixels representing the captured image;
   (c) a delay circuit that includes an adjustable time delay for receiving address signals and, based on a particular address signal, generating a respective time delay for that address signal; and
   (d) a decoder for receiving the delayed address signals and, based on each address signal, selecting a respective unit of the sample and hold circuit array for output.

7. The camera as in claim 6, wherein the decoder includes a plurality of sequentially numbered unit addresses from 1 to N, and wherein the adjustable time delay decreases with an increase in unit address.

8. The camera as in claim 6, wherein the adjustable delay circuit includes a plurality of delay cells and a multiplexer for selecting one or more of the delay cells according to the decoder address.

9. The camera as in claim 6, wherein the delay circuit is a programmable delay circuit.

10. The camera as in claim 6 further comprising a synchronizer for synchronizing an output of the delay circuit and address inputs to the decoder.

* * * * *